Patented May 7, 1946

2,400,012

UNITED STATES PATENT OFFICE 2,400,012

CATALYTIC PREPARATION OF CYMENES

Edwin R. Littmann, Westfield, N. J., assignor to Hercules Powder Company, Wilmington, Del., a corporation of Delaware No Drawing. Application December 2, 1942, Serial No. 467,658

8 Claims. (Cl. 260—668)

This invention relates to the preparation of cymenes and it relates particularly to the preparation of cymenes from menthanes.

Para-cymene has been prepared by treating terpenes with dehydrogenation catalysts under conditions which cause a portion of the terpene to be dehydrogenated to para-cymene. In such processes a portion of the reactants take up hydrogen thus released with the formation of para-menthane. However, in spite of the fact that para-menthane is thus a by-product of para-cymene formation, it has been found possible to prepare para-cymene from para-menthane.

Now in accordance with this invention, para-cymene is prepared by passing para-menthane at dehydrogenation temperatures over a catalyst containing palladium supported on a carrier having high surface activity. Likewise, ortho- and meta-menthane are reacted in the same manner to form the corresponding cymenes. The menthane is passed in liquid or vapor phase over or through the catalyst which contains palladium supported on a carrier having high surface activity, such as activated alumina, silica gel, activated carbon, and the like.

The resulting product contains para-cymene or other cymene in sufficient quantity to be useful for some purposes without purification. However, it will usually contain some para-menthane. In accordance with this invention, the product may be separated into a fraction essentially consisting of cymene and a fraction containing the menthane and the menthane-containing fraction then passed over the catalyst at dehydrogenating temperatures by itself or in admixture with added menthane or added unsaturated monocyclic terpenes.

The process in accordance with this invention is suitably applied to para-menthane formed as a by-product in the dehydrogenation of terpenes in general. Thus, a cymene may be prepared in accordance with this invention by passing a terpene or mixture of terpenes at dehydrogenation temperatures over a catalyst containing palladium supported on a carrier having high surface activity to produce a mixture containing a cymene and a menthane, whereupon the mixture is fractionated to obtain a fraction essentially consisting of the cymene and a fraction containing the menthane. The menthane fraction is then passed over the catalyst at dehydrogenating temperatures as a separate fraction or preferably in admixture with additional terpenes. Thus, by recycling the by-product menthane fraction, a substantially pure cymene is obtained from terpene with practically no loss of reactant.

The examples following will illustrate the process in accordance with this invention.

Example 1

A catalyst was prepared by impregnating 15 grams of activated alumina with a solution formed by dissolving one gram of palladium dichloride in a mixture of two cubic centimeters of hydrochloric acid (specific gravity 1.19) and eight cubic centimeters of water. The impregnated activated alumina was then thoroughly mixed with two cubic centimeters of 37% aqueous formaldehyde solution and then with 15 cubic centimeters of 10% aqueous sodium hydroxide solution. The catalyst mass was then recovered from the mixture by filtration followed by two successive washes with water and two successive washes with 20% aqueous acetic acid. It was then further washed with water until neutral and dried at 95° C.

The catalyst so prepared had a voids volume of 50%. Seventy-five grams of the catalyst were placed in a two centimeter diameter tube which was heated in an electric furnace. The catalyst was heated to 265° C. and maintained between 264° C. and 277° C. over a period of 2.28 hours while the vapor derived from the vaporization of fifty cubic centimeters of para-menthane was passed through the catalyst. The product obtained had a refractive index of 1.466 indicating a content of 65% para-cymene.

Additional para-cymene product similarly prepared was fractionated into a fraction of about 35% of the product but consisting of practically pure para-cymene and a fraction of about 65% of the product containing para-cymene and para-menthane. The latter fraction was passed over the catalyst in the same manner to produce a product rich in para-cymene. It was found also that the fraction containing para-menthane remaining in the product could be blended continuously with fresh para-menthane being dehydrogenated. Under such conditions of recycling, it was found the life of the catalyst was lengthened.

Example 2

A catalyst was prepared by impregnating 15 grams of activated carbon with a solution formed by dissolving one gram of palladium dichloride in a mixture of two cubic centimeters of hydrochloric acid (specific gravity 1.19) and eight cubic centimeters of water. The impregnated activated carbon was then thoroughly mixed with two cubic centimeters of 37% aqueous formaldehyde solution and then with 15 cubic centimeters of 10% aqueous sodium hydroxide solution. The catalyst mass was then recovered from the mixture by filtration followed by two successive washes with water and two successive washes with 20% aqueous acetic acid. It was then further washed with water until neutral and dried at 95° C.

Forty-five parts of the catalyst so prepared were charged into a convertor tube (2.9 centimeters diameter). The tube was placed in a constant temperature bath. Hydrogen was passed through the catalyst bed for twenty minutes while the catalyst was warming up to 260 to 270° C. Para-menthane (Bromine No. 2.3; $n_D^{20}$ 1.4480) was vaporized, preheated to 260° C. and passed through the catalyst bed while the temperature of the bath was maintained at 260° to 270° C. The product rate was 4.4 parts product per part palladium for one hour, i. e., 4.4 parts of product were condensed in a one-hour period for each part of palladium in the catalyst, all parts being on the same basis, by weight. The product condensed and collected in this time had a refractive index ($n_D^{20}$) of 1.4796 indicating a para-cymene content of 78.5%.

*Example 3*

Palladium chloride solution in water equivalent to 1.25 parts palladium was poured over 50 parts activated carbon (passing a sieve with 12 meshes per inch and standing on a sieve with 20 meshes per inch); then four parts 35.5% formaldehyde were poured over the mass with gentle stirring. Thirty parts 10% sodium hydroxide solution was then poured over the mass with stirring, care being taken that the temperature did not exceed 40° C. during this operation. After all the sodium hydroxide solution had been added, the temperature was allowed to rise to 60° C. After standing one hour at this temperature, the mass was washed with distilled water until neutral to litmus. It was then washed with 100 parts 10% acetic acid followed by a water wash until the odor of acetic acid was no longer discernible.

Twenty and five-tenths parts (dry weight) of the above catalysts were charged into a convertor tube. The tube was closed and immersed in a constant temperature bath. The catalyst was dried and reduced by passing hydrogen through it at 350° C. for 30 minutes. Para-menthane (Bromine No. 2.3; $n_D^{20}$ 1.4480) was then vaporized and passed through the catalyst bed at the rate of 7.80 parts product per part of palladium per hour for 1.25 hours during which the temperature was maintained at 260–270° C. The product upon condensation had a refractive index ($n_D^{20}$) of 1.4872 indicating that the product contained 91.2% para-cymene. The product rate was increased to 23.42 parts per part of palladium per hour. After one hour at this rate, the refractive index ($n_D^{20}$) was 1.4836 indicating that the product was 85.5% para-cymene.

*Example 4*

Twenty and five-tenths parts (dry weight) of catalyst prepared as in Example 3 were charged into a convertor tube (2.9 centimeters inside diameter). The tube was placed in a constant temperature bath. Hydrogen was passed through the catalyst bed for twenty minutes while the catalyst was warming up to 260° to 270° C. A light end (distilled fraction) from dehydrogenated monocyclic terpenes (Bromine No. 35; $n_D^{20}$ 1.4659 indicating 51% para-cymene, 15% unsaturated terpenes, and 34% para-menthane) was vaporized, preheated to 260° C. and passed through the catalyst bed while the temperature of the bath was maintained at 260° to 270° C. The product rate was 4.4 parts product per part palladium for one hour. The product collected in this time contained 92.5% paracymene and 7.5% of para-menthane and unconvertible material.

Utilizing the same catalyst and equipment, an unsaturated monocyclic terpene hydrocarbon fraction rich in dipentene was dehydrogenated in the same manner and the product continuously fractionated to form essentially pure para-cymene and the light end fraction, which contained the para-cymene in the product, described in the previous paragraph. The light end fraction was continuously mixed with the unsaturated terpene feed and recycled therewith through the catalyst.

The dehydrogenation of the para-menthane or other menthane may be carried out in the liquid or the vapor phase at any desired pressure. Preferably, operation is carried out in the vapor phase to insure efficient but brief contact with the catalyst. Temperatures as low as 150° C. and as high as 450° C. have been found effective in bringing about dehydrogenation. The higher temperatures in this range are usually most effective in bringing about substantially complete conversion but excessively high temperatures cause loss of reactants by cracking. It is preferred, therefore, to maintain the dehydrogenation catalyst at a temperature between about 250° C. and about 400° C. A diluent, such as, for example, carbon dioxide, nitrogen, helium and the like may be used with the para-menthane or other menthane reacted if desired.

The process in accordance with this invention has been found particularly well-adapted to the use of para-menthane or other menthane produced as a by-product in the dehydrogenation of unsaturated terpenes, such as dipentene, terpinene, terpinolene, the phellandrenes, paramenthene, sylvestrene, and the like. Thus, such unsaturated terpenes may be passed over palladium on a carrier having high surface activity at a dehydrogenation temperature and the product fractionated to form a substantially pure cymene fraction and a fraction containing cymene and menthane. The latter fraction may then be recycled with additional terpenes.

The catalyst utilized may be prepared as in the examples by depositing palladium upon activated alumina. Alternatively, the palladium may be deposited in the same manner on activated charcoal, silica gel, and like supports of high surface activity obtained by treatment developing expanded effective area. The peculiar effectiveness of the catalyst in producing high paracymene yields results from the combination of the specific metal palladium with a carrier having an abnormally high surface or surface activity brought about by an activation treatment or preparation. Any such carrier may be used. The reduction of the palladium may be carried out by formaldehyde, hydrogen, or other reducing agent. Usually, the palladium will be in a quantity of about 0.015 to 0.05 gram per cubic centimeter of the finished catalyst but quantities varying from 0.003 to 0.08 gram per cubic centimeter of catalyst have been found suitable.

The method in accordance with this invention is adapted to long periods of continuous operation since the catalyst utilized retains its activity. It has been found that catalyst life is particularly long for menthane dehydrogenation and that the presence of a menthane in a mixture including monocyclic unsaturated terpenes being dehydrogenated materially lengthens catalyst life as compared with dehydrogenation of the mixture without the menthane. This effect is obtained with quantities of the menthane in excess of about 4% by weight of the mixture of terpenes passed into the dehydrogenation zone. Thus, it is desirable to include between about 4% and about 40% by weight of menthane (based on the total mixture) in a monocyclic terpene reactant fed into a dehydrogenation zone, quantities between about 7% and about 20% being preferable. Conveniently, para-menthane obtained by fractionation of the dehydrogenation product of a monocyclic terpene which usually contains a small amount as a by-product or unconverted fraction, is so utilized.

What I claim and desire to protect by Letters Patent is:

1. The process of producing a cymene which comprises passing a menthane in admixture with a monocyclic terpene at dehydrogenation temperatures over a catalyst containing palladium supported on a carrier having high surface activity.

2. A process of producing a cymene which comprises passing a monocyclic terpene at dehydrogenation temperatures over a catalyst containing palladium supported on a carrier having high surface activity to produce a mixture containing a cymene and a menthane, fractionating the mixture to obtain a fraction essentially consisting of the cymene and a fraction containing the menthane, and recycling the menthane fraction in admixture with additional monocyclic terpene over said catalyst at dehydrogenating temperatures.

3. A process of producing para-cymene which comprises passing a monocyclic terpene at dehydrogenation temperatures over a catalyst containing palladium supported on a carrier having high surface activity to produce a mixture containing para-cymene and para-menthane, fractionating the mixture to obtain a fraction essentially consisting of para-cymene and a fraction containing para-menthane, and recycling the para-menthane fraction in admixture with additional monocyclic terpene over the said catalyst at dehydrogenating temperatures.

4. A process of producing para-cymene which comprises passing a monocyclic terpene at a temperature in the range between about 150° C. and about 450° C. over a catalyst containing palladium supported on a carrier having high surface activity to produce a mixture containing para-cymene and para-menthane, fractionating the mixture to obtain a fraction essentially consisting of para-cymene and a fraction containing para-menthane, and recycling the para-menthane fraction in admixture with additional monocyclic terpene over the said catalyst at the said temperature.

5. A process of producing para-cymene which comprises passing a monocyclic terpene at a temperature in the range between about 250° C. and about 400° C. over a catalyst containing palladium supported on a carrier having high surface activity to produce a mixture containing para-cymene and para-menthane, fractionating the mixture to obtain a fraction essentially consisting of para-cymene and a fraction containing para-menthane, and recycling the para-menthane fraction in admixture with additional monocyclic terpene over the said catalyst at the said temperature.

6. A process of producing para-cymene which comprises passing a monocyclic terpene at dehydrogenation temperatures over a catalyst containing palladium supported on a carrier having high surface activity to produce a mixture containing para-cymene and para-menthane, fractionating the mixture to obtain a fraction essentially consisting of para-cymene and a fraction containing para-menthane, and recycling the para-methane fraction in admixture with additional monocyclic terpene, said admixture containing from about 4% to about 40% by weight of para-menthane, over the said catalyst at dehydrogenating temperatures.

7. A process of producing para-cymene which comprises passing a monocyclic terpene at dehydrogenation temperatures over a catalyst containing palladium supported on Activated Alumina to produce a mixture containing para-cymene and para-menthane, fractionating the mixture to obtain a fraction essentially consisting of para-cymene and a fraction containing para-menthane, and recycling the para-menthane fraction in admixture with additional monocyclic terpene over the said catalyst at dehydrogenating temperatures.

8. A process of producing para-cymene which comprises passing a monocyclic terpene at dehydrogenation temperatures over a catalyst containing palladium supported on activated carbon to produce a mixture containing para-cymene and para-menthane, fractionating the mixture to obtain a fraction essentially consisting of para-cymene and a fraction containing para-menthane, and recycling the para-menthane fraction in admixture with additional monocyclic terpene over the said catalyst at dehydrogenating temperatures.

EDWIN R. LITTMANN.